United States Patent
Breuer et al.

(10) Patent No.: US 12,418,885 B2
(45) Date of Patent: Sep. 16, 2025

(54) METHOD FOR PAGING USER EQUIPMENTS IN A CELLULAR NETWORK

(71) Applicant: Telit Cinterion Deutschland GmbH, Munich (DE)

(72) Inventors: Volker Breuer, Boetzow (DE); Osaid Khaliq, Berlin (DE); Florian Denzin, Berlin (DE)

(73) Assignee: Telit Cinterion Deutschland GmbH, Munich (DE)

( * ) Notice: Subject to any disclaimer, the term of this patent is extended or adjusted under 35 U.S.C. 154(b) by 348 days.

(21) Appl. No.: 17/912,897

(22) PCT Filed: Mar. 30, 2021

(86) PCT No.: PCT/EP2021/058260
§ 371 (c)(1),
(2) Date: Sep. 20, 2022

(87) PCT Pub. No.: WO2021/198234
PCT Pub. Date: Oct. 7, 2021

(65) Prior Publication Data
US 2023/0171732 A1    Jun. 1, 2023

(30) Foreign Application Priority Data
Apr. 3, 2020 (EP) .................................... 20168050

(51) Int. Cl.
*H04W 68/02* (2009.01)
*H04W 52/02* (2009.01)
(52) U.S. Cl.
CPC ........ *H04W 68/02* (2013.01); *H04W 52/0216* (2013.01)

(58) Field of Classification Search
CPC .......................... H04W 68/02; H04W 52/0216
See application file for complete search history.

(56) References Cited

U.S. PATENT DOCUMENTS

| | | | |
|---|---|---|---|
| 2008/0182596 A1* | 7/2008 | Wang | H04W 52/0219 455/458 |
| 2011/0244907 A1* | 10/2011 | Golaup | H04W 4/08 455/509 |

(Continued)

FOREIGN PATENT DOCUMENTS

| | | |
|---|---|---|
| EP | 0973349 A2 | 1/2000 |
| EP | 2346291 A1 | 7/2011 |

OTHER PUBLICATIONS

International Search Report (PCT/ISA/210) and Written Opinion (PCT/ISA/237) mailed on Apr. 26, 2021 by the European Patent Office as the International Searching Authority for International Application No. PCT/EP2021/058260 [11 pages].

*Primary Examiner* — Congvan Tran
(74) *Attorney, Agent, or Firm* — PEARL COHEN ZEDEK LATZER BARATZ LLP (57) ABSTRACT

Provided is a method for a component of a cellular network for paging a plurality of user equipments being assigned to one of at least two paging groups, wherein each paging group is paged at a paging occasion defined for said paging group. The method comprises the steps of ascertaining at least one physical characteristics of said user equipment, assigning the user equipment to a paging group considering said at least one physical characteristic, and sending an information message related to paging at a defined paging occasion depending on the assigned paging group.

13 Claims, 3 Drawing Sheets

(56) References Cited

U.S. PATENT DOCUMENTS

| | | | | |
|---|---|---|---|---|
| 2013/0115977 A1* | 5/2013 | Chandramouli | ........ | H04W 4/08 |
| | | | | 455/515 |
| 2014/0221025 A1* | 8/2014 | Chandramouli | ........ | H04W 8/08 |
| | | | | 455/458 |
| 2017/0181218 A1* | 6/2017 | Liu | ....................... | H04W 76/27 |
| 2020/0053695 A1* | 2/2020 | Charbit | ............... | H04W 84/022 |
| 2021/0360582 A1* | 11/2021 | Priyanto | ................. | H04W 4/08 |

\* cited by examiner

METHOD FOR PAGING USER EQUIPMENTS IN A CELLULAR NETWORK

CROSS-REFERENCE TO RELATED APPLICATIONS

This application is a National Phase Application of PCT International Application No. PCT/EP2021/058260, International Filing Date Mar. 30, 2021, claiming priority to European Patent Application No. 20168050.1 filed Apr. 3, 2020, which is hereby incorporated by reference.

FIELD OF THE INVENTION

The present invention relates to a method for a cellular network component. The invention also pertains to a first cellular network component using said method. The invention also relates to a second cellular network component.

BACKGROUND OF THE INVENTION

In the field of wireless communication it is known to carry out paging of user equipments operating on at least one base station of a cellular network by means of group based paging. That means certain user equipments are placed in one paging group, and the user equipments of one paging group are all paged at the same time, in case of a paging occurrence, like an incoming call. Today the paging groups are created by means of a modulo a calculation based on the IMSI of the user equipment.

In today's cellular networks however the user equipments have fundamental different service needs, e.g. IoT (Internet of things) devices are practically not called from outside, but they intend to optimize their power consumption behavior. Out of that reason, to put IoT devices with smartphone in one paging group could lead to an overly power consumption for the IoT devices. This is because with each paging for a smartphone, the IoT device needs to decode the paging message, although it is extremely unlikely that it will be paged. Hence it requires a solution which leads to a smart distribution of user equipments. Due to the fact that the cellular network does not know the type of user equipment when it is operating in the cellular network, it is not trivial to achieve the optimal distribution for the user equipments in paging groups.

It is therefore the goal of present invention to overcome the mentioned disadvantages and to propose a solution for an improved composition of paging groups, and consequently to reduce power consumption for such user equipments.

Further alternative and advantageous solutions would, accordingly, be desirable in the art.

SUMMARY OF THE INVENTION

A first aspect of the invention is embodied as a method to operate a cellular network component. A second aspect of the invention is embodied as a cellular network component. A third aspect of the invention is embodied as a second cellular network component.

According to the first aspect of the invention it is proposed a component of a cellular network for paging a plurality of user equipments being assigned to one of at least two paging groups, wherein each paging group is paged at a paging occasion defined for said paging group, wherein for paging one of said plurality of user equipments the method comprises the steps of:

ascertaining at least one physical characteristics of said user equipment, assigning the user equipment to a paging group considering said at least one physical characteristic, sending an information message related to paging at a defined paging occasion depending on the assigned paging group.

This inventive method relates to a component of a cellular network which is capable of implementing the technology standard of 3G, 4G, 5G or beyond. The cellular network is capable of serving, in particular through its base stations, a plurality of user equipments.

The respective component of the cellular network is at least one server or equipment, that cares for paging of user equipments. This is usually a core component, in particular one or a combination of servers, who constitute at least a virtual role. Also a dedicated server, typically load-balanced on various physical machines, is a possible implementation of that component of the cellular network.

Paging is the task that regularly requests from user equipments to listen to messages from the cellular network, and decode one or more paging messages, if there is an incoming call or other connection request dedicated for the user equipment.

For doing so, user equipments are organized in paging groups. For each paging group potential paging messages are sent within time windows which are dedicated per paging group. Such time window is called hereinafter paging occasion. Therefore only during the paging occasion of the group a user equipment is assigned to, it needs to listen to paging related messages. The beginning of the paging occasion typically is determined by a SFN which is calculated for each paging occasion, taking at least into account the cell specific paging cycle.

According to an improvement in the recent developments of the 5G technology standard, a new message for group wakeup signalling (gWUS) is introduced. With that the user equipments retrieve during the paging occasion time window an indication that now the wakeup would need to happen for potential paging. But if for the whole group of user equipments no incoming request is due, then no paging message is expected and needs to be received, decoded and processed. This is indicated in the gWUS message. The aim of this improvement is to reduce the power consumption for the paging, in particular having in mind the growing amount of so-called IoT devices, which are only rarely or simply never will be paged.

As a matter of fact this approach is only then useful and will achieve the aimed power saving, when in fact during a remarkable number of paging occasions no pagings occur for the whole paging group.

By now the grouping is carried out by means of the so-called UE_ID, which is the IMSI modulo 1024. This value is then used in the individual determination of the SFN for a paging occasion.

With this approach it will most likely result in a group of many user equipments with a mixture of smartphones and IoT devices. Hence it is today to assume that practically each paging window will have an incoming call, which leads to the need for all user equipments of a group to receive and decode the paging messages. Hence, the envisaged goal would not be reached. The user equipments would consume more power by listening consecutively to the gWUS time windows and the following paging, so that the overall power saving intended by the introduction of the wakeup signalling will not be reached. This is where the invention comes into play.

According to that a plurality of user equipments operating in the cellular network are each assigned to one of at least two paging groups.

The paging groups are designed to be paged at a paging occasion, which defines the mentioned time window for the paging group. Each user equipment derives from the paging group assignment the timing of the paging occasion.

To achieve an advantageous distribution of paging groups, the component of the cellular network ascertains at least one physical characteristics of one of the user equipments.

There are many options for said physical characteristics, in particular by means of handling the user equipments capabilities, that can be requested by the serving base station of the user equipment.

According to an advantageous embodiment it is proposed that the at least one physical characteristics relates to a customer IMEI assigned to the user equipment, and the customer IMEIs are defined reflecting a group of user equipments carrying out similar operations.

With that the customer IMEI—if available—is used. The IMEI is the international mobile equipment identity, a unique number for each mobile device in the world. It is known that for large device manufacturers blocks of customer IMEIs are allocated. As such device manufacturers produce and equip with one out of the allocated block of customer IMEIs its user equipments, it is safe to rely on, that such devices with customer IMEIs of the same range have similar behavior, instead of a mixture of mobile handsets and IoT devices, which only rarely send data.

Moreover a couple of customer IMEI ranges may be considered as covering a similar type of user equipments, at least in sense of paging behavior. This would in particular apply for the customer IMEI ranges allocated for various manufacturers e.g. of metering applications.

Based on said at least one physical characteristics the user equipment is assigned to a paging group, when similar operations are carried out. Advantageously said similar operations comprises at least one out of the group of:
- a value indicating paging probability,
- a mobile originated data transmission periodicity,
- a mobile terminated data transmission periodicity,
- a mobile terminated data transmission size,
- a mobile originated data transmission size.

This type of similarity measuring in particular comprises one or a combination of these values.

The paging probability depicts, how likely it is that during a time period a user equipment will be paged. This probability is preferably defined in a ratio of number of pagings per paging occasion, or number of paging occasion until a paging is happening in average.

This value dramatically varies between smartphones and metering devices, but it is not necessarily 0 for the latter. Hence also in the field of IoT devices differences may happen, e.g. for POS devices compared to asset tracking devices.

In contrast also the periodicity itself may be viewed, be it in mobile originated, that means initiated at the user equipment, or mobile terminated, that means incoming, is a good indication to define groups of similar behaving user equipments. In particular a combination of these both values may be considered for this distribution.

Another approach is to view the data transmission size, in particular an average of this value, or any other statistical metric, either or both in uplink and/or downlink direction. This gives an idea of different types of user equipments, in particular for distinguishing different IoT devices. A metering device has very low uplink transmission size on each regular occasion. This is different e.g. in the eHealth sector.

This general approach is advantageous and contributes to the envisaged goal better than other approaches, as the cellular network and the respective component has no means to figure out the type of user equipment and its envisaged paging behavior.

For each paging occasion consequently the component of the cellular network sends, resp. instructs other cellular network components—in particular the base station—to send an information message related to paging at a defined paging occasion. This information message is in fact sent to each user equipment being assigned to the paging group.

This information message is according to a preferred embodiment at least one out of:
- a paging message related to said paging occasion, and
- a wakeup signal related to said paging occasion.

With the first option directly a paging message is sent, if it needs to be sent. From the paging message the user equipment can derive if an incoming request for the respective user equipment appeared. This is typically indicated by a RNTI (Radio Network Temporary Identifier) which depicts the user equipment, for which a paging message is available. If the RNTI of the user equipment is signaled, then the whole paging message needs to be processed, and depending on the type of paging, e.g. an incoming call would be handled accordingly.

With the second option the so-called gWUS signalling is meant, which allows the user equipments of a paging group to figure out with much less energy consumption, if a paging message needs to be read.

This wakeup signal is small in size and in particular signaled in a dedicated range of the frequency band, which allows the user equipment to read and process this signal without much power-consumption prone overhead.

The wakeup signal contains at least a binary information if for the current paging occasion a paging message for at least one user equipment of the paging group is available. If this is the case, then all user equipments of the group need to read and process the following paging message.

With the inventive method it is assured that for user equipments with less pagings, in particular in the field of IoT devices, no waste of energy is happening due to repeatedly decoding and processing of full paging messages, in order to finally find out that no message for the respective user equipment was signaled.

In a preferred embodiment it is suggested that said defined paging occasions depending on the assigned paging group turn up repeatedly considering a predefined paging periodicity,
wherein for a first of said paging groups the predefined paging periodicity results in less frequent paging occasions than for a second of said paging groups.

With this embodiment the effect of the inventive method is even improved. By now the paging occasions of all paging groups, in particular when defined through the UE_ID, are equally distributed over time of the paging cycle. However when—as envisaged with the inventive method—paging groups are achieved that have a lower amount of pagings in a time period than for others, it is preferable to carry out a reduction of paging occasions.

This leads to the embodiment wherein each paging group has a predefined paging periodicity, in particular applied by the determination rule to figure out the next SFN when a paging occasion for a paging group comes up.

With this embodiment however the predefined paging periodicity differs among groups. For those groups with lower paging intensity, in particular those defined through the customer IMEI ranges, then the paging periodicity leads to less frequent paging occasions than for other paging groups.

This may result e.g. that paging group #1 has its paging occasion all 120 ms, while for paging group #2 every 480 ms would also be sufficient. With that embodiment the reduction of power consumption is in any case achieved, even when the user equipments would still need to decode the paging messages on each paging occasion. With the improved distribution of user equipments on paging groups considering their behavior, a better individual paging group configuration is possible, like in this embodiment the paging occurrence frequency.

In a preferred embodiment it is proposed that the number of user equipments assigned to the first paging group differs from the number of user equipments assigned to the second paging group.

This embodiment removes a restriction of today's paging group distribution. As by now through the UE_ID based definition of the paging group an even distribution is achieved, where only slight differences may appear, this restriction would hinder introducing an approach as indicated with the suggested inventive method.

The effect of the suggested inventive method would however be lost, if not sufficient user equipments can be found to put into a paging group with rare paging occasions according to the physical characteristics of the user equipment. To fill up this group with other user equipments would jeopardize the envisaged effect.

Hence it is suggested to allow for paging groups with differing number of user equipments, wherein a remarkable difference is foreseen, with at least a 10% reduction compared to "common" paging groups.

However also a higher amount of user equipments in a paging group e.g. for IoT devices is a possible option.

When the paging group distribution is established it may additionally appear that for a paging group the envisaged effect is not accomplished due to the fact that one or a few of the assigned user equipments are not behaving similarly compared to the others.

Hence it is suggested in a further preferred embodiment the step of reassigning a user equipment to another paging group in case the paging probability of said user equipment is higher than for the majority of the other user equipment of the assigned paging group.

Preferably this steps comprises monitoring of paging behaviors of the user equipments, in particular carried out by the component of the cellular network. However alternatively an indication from outside, e.g. through a user equipment or a remote server via internet to the cellular network, might be taken as trigger to carry out the reassigning step of this embodiment.

This embodiment therefore suggests that at least one user equipment that is identified as having a higher paging probability than the rest of the user equipments which is assigned to said paging group, is reassigned to another paging group.

This reassignment might comprise that for that user equipment a distribution as usually done, in particular by means of the UE_ID, is carried out. This assures that it is removed from the paging group identified through the physical characteristics.

This embodiment is advantageous as it also covers a change in behavior or potential updates of user equipment which lead to a change in paging behavior. In particular when a couple of IoT related paging groups for different types of IoT devices are established, with this embodiment it is also possible to reassign single user equipments from the one to the other IoT related paging group.

The reassigning is happening by signalling to the user equipment an indication of the new paging group, which will then considered for determining the paging occasions of said group.

The mechanism for reassigning to a different paging group ae known by today, i.e. in seldom cases when applying distribution via module IMSO groups appear unequal and hence certain user equipments may be reassigned.

According to a second aspect of the invention it is proposed a first cellular network component applying paging operation of user equipments being assigned to at least two paging groups, and each paging group is paged at a paging occasion defined for said paging group, wherein for paging a user equipment the method first cellular network component is configured to:

ascertain at least one physical characteristics of the user equipment, assign the user equipment to a paging group considering said at least one physical characteristic, send a paging message at a defined paging occasion depending on the assigned paging group.

This aspect of the invention relates to a cellular network component that is capable of carrying out paging related activities in the cellular network. In particular—depending upon the technology standard implemented in the cellular network resp. the core network—this is applied in LTE to a MME (Mobility Management Entity) or in NR to a AMF (Access and Mobility Management Function).

In particular this cellular network component comprises processing circuitry for carrying out operating software, in particular for paging organization.

It further comprises communication circuitry for exchanging signals with other cellular network components, in particular base stations (resp. eNodeB/gNodeBs).

The second aspect of the invention shares the advantages of the first aspect.

According to a third aspect of the invention it is proposed a second cellular network component configured to store a customer IMEI information for at least one user equipment for making available to at least one first cellular network component.

This aspect of the invention relates to another cellular network component than the first cellular network component of the second aspect of the invention. This has the capability to store a customer IMEI information for at least one user equipment.

This is preferably carried out by a cellular network component with access to the HLR/HSS of a cellular network, or it is a HLR/HSS itself with this additional capability.

The cellular network component is additionally capable of making this information available to a first cellular network component according to the second aspect of the invention.

This may then carry out the distribution among paging groups considering as physical characteristics according to the first and second aspect of the invention.

As it is shown this invention advantageously solves the depicted problem and provides a way of distribution user equipments with low paging frequency in dedicated paging groups and such assure power saving objectives that are in particular envisaged with the introduction of group wakeup signalling. With the reduction of power, also an environmental effect is achieved, as an overall power consumption reduction will result from applying this invention.

BRIEF DESCRIPTION OF THE DRAWINGS

The following description and the annexed drawings set forth in detail certain illustrative aspects and are indicative of but a few of the various ways in which the principles of the embodiments may be employed. Characteristics and advantages of the present invention will appear when reading the following description and annexed drawings of advantageous embodiments given as illustrative but not restrictive examples.

Figure 1A:
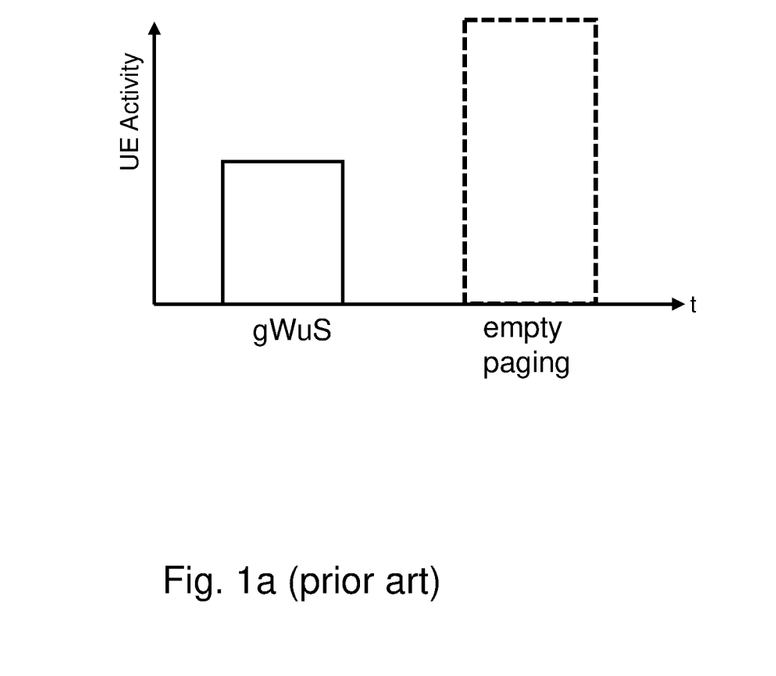
FIG. 1a+b represents a power consumption situation for a user equipment according to the known prior art.
Figure 1B:
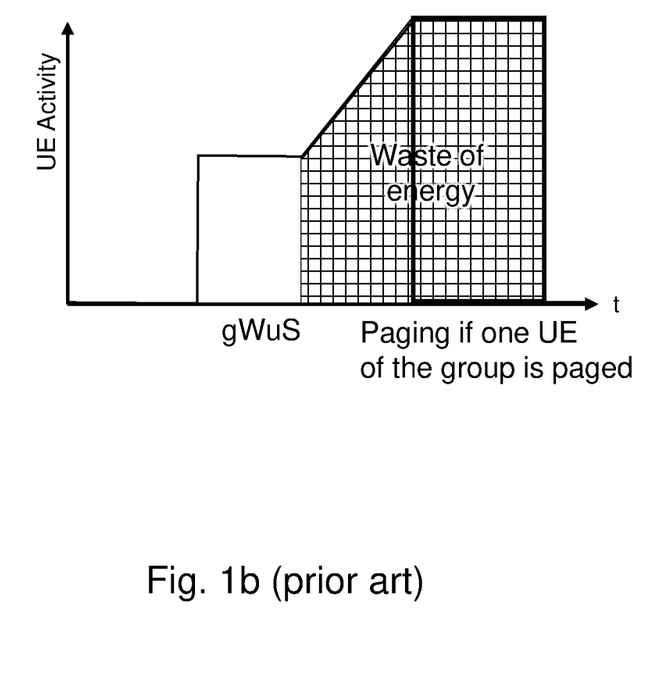

FIGS. 1a and 1b schematically show the activity situation of a user equipment being part of a paging group depending on if a paging happens in the paging group or not. This activity directly correlates with the power consumption, indicated by the area under the curve. The user equipment is camping on a base station of the cellular network, in particular supporting 4G or 5G technology standard.

In FIG. 1a the good case is shown. A group wakeup signal (gWUS) is send and needs to be received by the user equipments. This is happening right at the beginning of a paging occasion of the paging group. This beginning of a paging occasion is in particular defined by a SFN (system frame number), which can be determined from the paging group identification, the paging cycle of the base station, and potential additional parameters.

At each paging occasion the user equipment needs to apply some activity to read and process the group wakeup signalling (gWUS). This is supposed to indicate if for the paging group a paging is due during said paging occasion or not.

For that the wakeup signal is only signalled in a defined small range in the supported frequency range of the serving base station and is also small in size. This leads to the situation that the user equipment only needs to carry out a limited amount of activity to read and process the wakeup signal.

In FIG. 1a the wakeup signal indicates no paging. Hence the dotted box—indicating the potential activity for receiving a paging message—does not need to be applied, as an empty (or none) paging message is submitted. The user equipment knows from the wakeup signal, that it does not need to receive and process the paging message.

Different is the situation in FIG. 1b, where the wakeup signal indicates that a paging for that paging group is done in that paging occasion. This leads for the user equipment to apply additional activity if only one user equipment of the paging group is paged.

The amount of activity, and consequently power consumption, is clearly visible in that graph.

Figure 2:
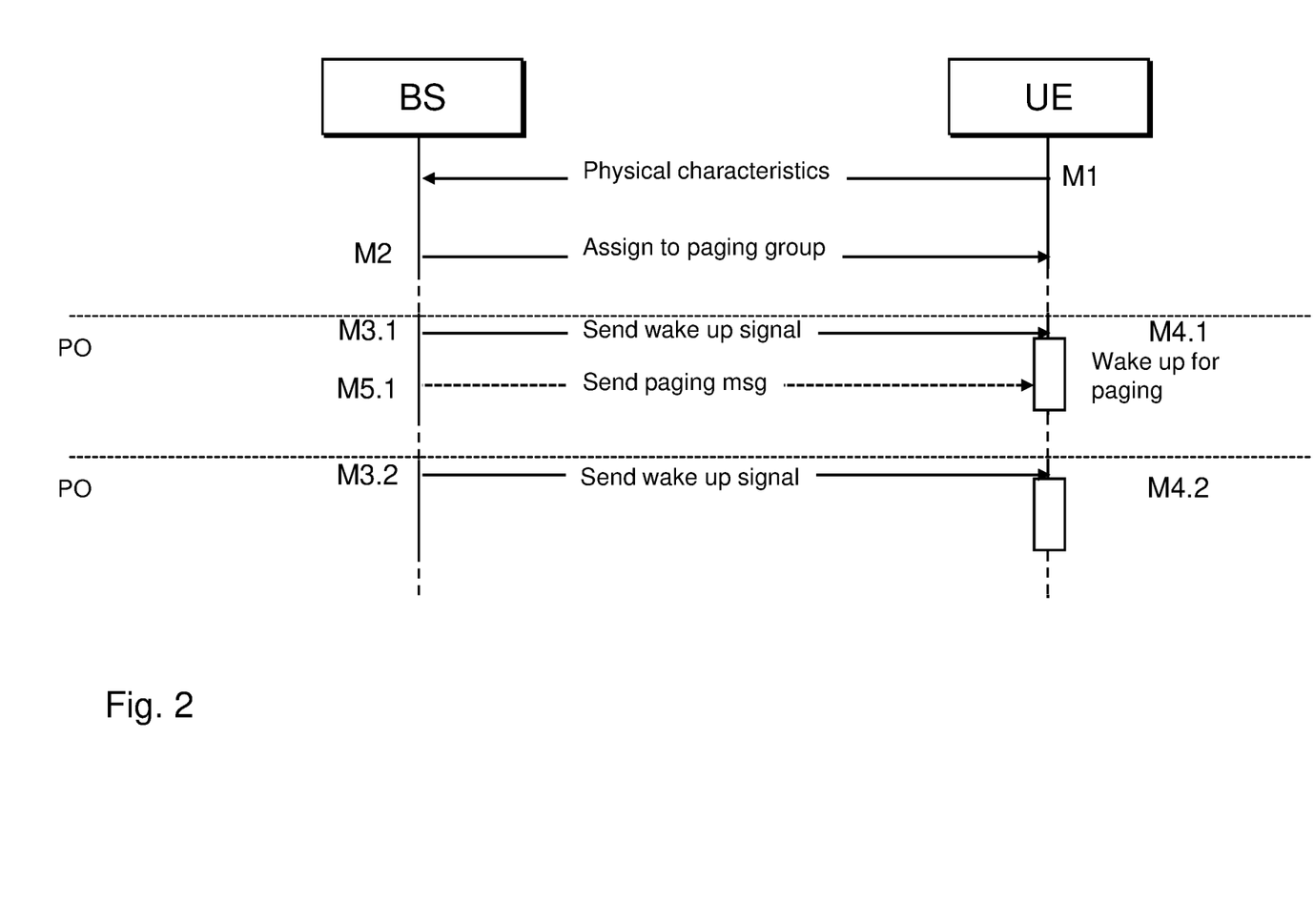
FIG. 2 represents an exemplifying sequence diagram of an embodiment of the inventive method.

However this activity is in vain, if the paging applies to another user equipment of the paging group. It becomes apparent, that with the number of paging occasions where the situation of FIG. 1b happens, the envisaged effect of introducing the group wakeup signal is not achieved. Therefore it is key to increase the likelihood that the situation as shown in FIG. 1a is happening. For this the invention is applied. An exemplifying embodiment of the invention is shown in FIG. 2.

Here a sequence diagram shown messages between a base station BS and a user equipment UE. The base station BS is the serving base station, while the user equipment camps on the serving base station.

At an early point in time, the user equipment makes available with message M1 its physical characteristics to the base station BS. This may be carried out when the user equipments capabilities are submitted during registration procedure. Alternatively this is not made available through the user equipment to the base station, but somehow stored in the HSS/HLR of the cellular network, this applies in particular to the customer IMEI (CI MEI).

Effectively the component of the cellular network has to get knowledge about that physical characteristics, and instruct the base station to inform the user equipment about its paging group assignment, as shown with message M2. With the paging group assignment the user equipment can always derive the time of the next paging occasion PO.

With the dotted line the time of the next paging occasion PO is indicated. This starts with sending a wakeup signal M3.1 from the base station to the user equipments of the paging group. This is preferably happening in a common channel signalling or with the dedicated channel when using the user equipment's C-RNTI identity.

The user equipment is prepared to receive and process this wakeup signal M3.1 due to the determination of the timing of the next paging occasion PO. It literally woke up for getting the wakeup signal.

It then receives and processes the wakeup signal in M4.1, and figures out if a paging message will be sent for the user equipments of the paging group it is part of.

In this paging occasion this is indeed the case. Consequently with message M5.1 a paging message is submitted, which needs to be received and processed by the user equipment.

Depending on if the paging is dedicated for said user equipment or not, potentially additional steps need to be carried out then. However for some type of IoT devices the probability is remarkably low, hence the efforts for receiving the paging message was then in vain, and this is true for the majority of paging messages.

In the next paging occasion PO—which is some time later, as indicated by the dashed vertical axes—again it starts with the wakeup signal M3.2. The user equipment is prepared to receive this wakeup signal and to process it, which happens within step M4.2.

This time the wakeup signal does not indicate that a paging will happen in that current paging occasion. That means for the user equipment UE, that it can avoid decoding signals for a paging message.

After each paging occasion the user equipment can go in a mode with no activity until the next paging occasion is due. This operation will continue over time.

Figure 3:
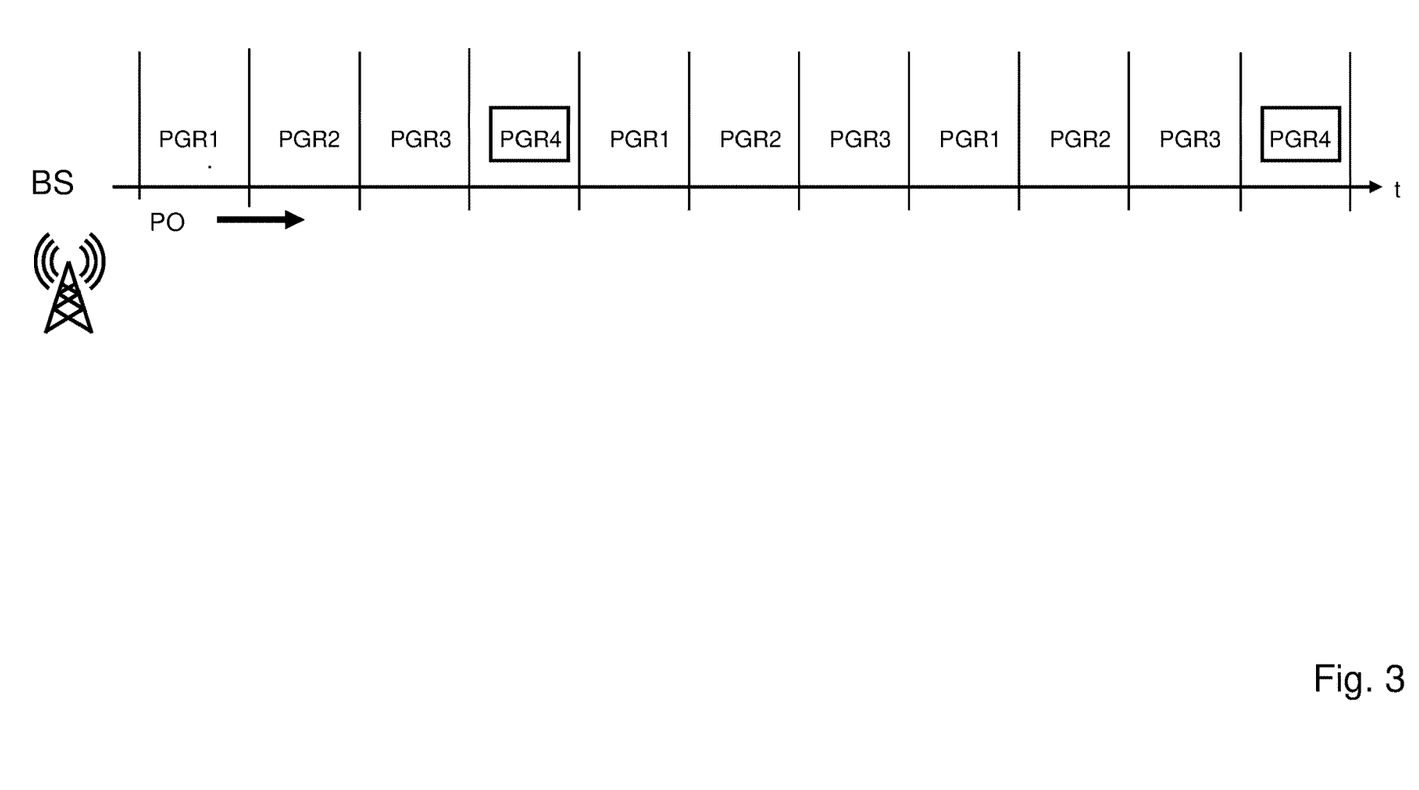
FIG. 3 shows the distribution of paging occasions for paging groups according to an exemplifying embodiment of the invention.

FIG. 3 shows the distribution of the paging occasions PO of a couple of paging groups PGR1-4 over time, for one base station.

The base station provides the paging signalling between the cellular network and the user equipments, it is however instructed by the first component of the cellular network. However, the duration of a paging occasion per paging group is preferably individual for each base station.

In contrast the distribution of user equipments into paging groups is governed by the first component of the cellular network. This also relates to the paging periodicity per paging group.

The result of such a configuration of paging groups can be seen in FIG. 3. Here it is shown a succession of paging occasions for different paging groups. In this simplifying example 4 paging groups PGR1-PGR4 are distinguished.

In this example paging group PGR4 is designated for user equipment with low paging probability, while the other paging groups PGR1-PGR3 have a common distribution.

According to the inventive method user equipments with similar physical characteristics, in particular at least one range of CIMEIs, are placed in paging group PGR4.

Due to the expected low number of pagings for this type of user equipments, in particular metering applications or the like, it was decided to double the time between two paging occasions for said paging group PGR4 compared to common paging groups. Hence it shows that for the paging groups PGR1-PGR3 paging occasions PO appear in each cycle, while the paging occasion PO for paging group PGR4 only happens every second cycle.

Would a user equipment with much higher paging frequency be part of the paging group 4, then the effect would be lost. Preferably the first component of the cellular network has means to detect such situations of one user equipment having remarkably different paging behaviors than the others. When such a deviation is detected the first component of the cellular network will then apply a reassignment of that at least one user equipment with different paging behavior, and thus assure that a comparably homogenous group of user equipments are part of that paging group PGR4.

In the above detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The above detailed description is, therefore, not to be taken in a limiting sense, and the scope of the present invention is defined only by the appended claims, appropriately interpreted, along with the full range of equivalents to which the claims are entitled.

The invention claimed is:

1. A method for a component of a cellular network for paging a plurality of user equipments (UE) being assigned to one of at least two paging groups (PGR), wherein each paging group is paged at paging occasions (PO) defined for said paging group,
wherein for paging one of said plurality of user equipments (UE) the method comprises the steps of:
ascertaining at least one physical characteristics of said user equipment,
assigning the user equipment to a paging group (PGR) considering said at least one physical characteristic, and
sending an information message related to paging at a defined paging occasion depending on the assigned paging group;
wherein the at least one physical characteristics relates to a customer IMEI assigned to the user equipment (UE), and the customer IMEIs are defined reflecting a group of user equipments carrying out similar operations.

2. The method according to claim 1,
wherein said information message related to paging is one of:
a paging message related to said paging occasion (PO), and
a wakeup signal (gWUS) related to said paging occasion (PO).

3. The method according to claim 1, comprising that said defined paging occasions (PO) depending on the assigned paging group (PGR) turn up repeatedly considering a predefined paging periodicity,
wherein for a first paging group of said at least two paging groups the predefined paging periodicity results in less frequent paging occasions than for a second paging group of said at least two paging groups.

4. The method according to claim 3, wherein the number of user equipments (UE) assigned to the first paging group (PGR1) differs from the number of user equipments assigned to the second paging group (PGR2).

5. The method according to claim 1,
wherein said similar operations comprises at least one out of the group of:
a value indicating paging probability,
a mobile originated data transmission periodicity,
a mobile terminated data transmission periodicity,
a mobile terminated data transmission size,
a mobile originated data transmission size.

6. The method according to claim 1, comprising the step of reassigning the user equipment (UE) to another paging group (PGR) of the at least two paging groups in case a paging probability of said user equipment (UE) is higher than of a majority of other user equipment of the assigned paging group.

7. The first cellular network component according to claim 1,
further configured that said defined paging occasions (PO) depending on the assigned paging group (PGR) turn up repeatedly considering a predefined paging periodicity,
wherein for a first paging group of said at least two paging groups (PGR1) the predefined paging periodicity results in less frequent paging occasions (PO) than for a second paging group of said paging group paging groups (PGR2).

8. The first cellular network component according to claim 7,
wherein the number of user equipments (UE) assigned to the first paging group (PGR1) differs from the number of user equipments (UE) assigned to the second paging group (PGR2).

9. A first cellular network component applying paging operation of user equipments (UE) being assigned to at least two paging groups (PGR), and each paging group is paged at paging occasions (PO) defined for said paging group,
wherein for paging a user equipment (UE) the first cellular network component is configured to:
ascertain at least one physical characteristics of the user equipment (UE),
assign the user equipment (UE) to a paging group (PGR) considering said at least one physical characteristic,
send a paging message at a defined paging occasion (PO) depending on the assigned paging group;
wherein the at least one physical characteristics relates to a customer IMEI assigned to the user equipment (UE), and the customer IMEIs are defined reflecting a group of user equipments carrying out similar operations.

10. The first cellular network component according to claim 9,
   wherein said information message related to paging is one out of:
      a paging message related to said paging occasion (PO), and
      a wakeup signal (gWUS) related to said paging occasion (PO).

11. The first cellular network component according to claim 9,
   wherein said similar operations comprises at least one out of the group of:
      a value indicating paging probability,
      a mobile originated data transmission periodicity,
      a mobile terminated data transmission periodicity,
      a mobile terminated data transmission size,
      a mobile originated data transmission size.

12. The first cellular network component according to claim 9,
   further configured to reassign the user equipment (UE) to another paging group (PGR) of the at least two paging froups in case a paging probability of said user equipment is higher than a majority of other user equipment of the assigned paging group.

13. The first cellular network component of claim 9, wherein the first cellular network component is communicatively coupled to a second cellular network component configured to store a customer IMEI information for at least one user equipment (UE) for making available to the first cellular network component.

\* \* \* \* \*